United States Patent [19]

Becker

[11] Patent Number: 4,915,578
[45] Date of Patent: Apr. 10, 1990

[54] BIN UNSTACKING MACHINE

[75] Inventor: Henry A. Becker, North Manchester, Ind.

[73] Assignee: Total Tote, Inc., North Manchester, Ind.

[21] Appl. No.: 223,345

[22] Filed: Jul. 25, 1988

[51] Int. Cl.$^4$ .................. B65G 59/06; B65G 59/10
[52] U.S. Cl. .................. 414/797.6; 221/253; 414/795.6
[58] Field of Search .................. 221/236, 253, 297; 414/795.6, 797.6, 797.7, 797.9

[56] References Cited

U.S. PATENT DOCUMENTS

| | | |
|---|---|---|
| 1,362,441 | 12/1920 | Sawhill . |
| 2,279,420 | 4/1942 | Thum .................. 414/797.7 X |
| 2,629,503 | 2/1953 | Neja . |
| 3,003,661 | 10/1961 | McGrath . |
| 3,325,021 | 6/1967 | Burns et al. . |
| 3,370,724 | 2/1968 | Burns et al. . |
| 3,468,455 | 9/1969 | Voorhis . |
| 3,658,194 | 4/1972 | Gendron et al. .................. 414/795.6 |
| 3,869,048 | 3/1975 | Takahashi . |
| 3,895,477 | 7/1975 | Yamashita .................. 53/59 R |
| 4,077,540 | 3/1978 | Butler .................. 221/297 |
| 4,545,714 | 10/1985 | Johnson et al. .................. 414/795.6 X |

Primary Examiner—Robert J. Spar
Assistant Examiner—Janice Krizek
Attorney, Agent, or Firm—Barnes & Thornburg

[57] ABSTRACT

A machine for unstacking and dispensing containers to be filled. The machine includes multiple sprocket wheels and chains which include retaining bars and push tabs for supporting a stack of bins and for dispensing an individual bin. A conveyor transports the bins away from the machine and a programmable controller correlates the motion of both the unstacker/dispenser and the conveyor to allow for continuous dispensing of containers automatically.

12 Claims, 3 Drawing Sheets

U.S. Patent  Apr. 10, 1990  Sheet 1 of 3  4,915,578 and is connected to a sprocket wheel 26
BIN UNSTACKING MACHINE

SUMMARY OF THE INVENTION

This invention relates to unstacking machines and will have application to machines for unstacking and dispensing bins and other similar containers.

Bin unstackers are useful machines for automatic dispensing of bins to temporarily store parts produced by injection molding machines, stamping machines, and die casting machines, among others. The bin unstacking machine of this invention utilizes a plurality of synchronous chains and a conveyor to both dispense a single bin from a stack and to deliver the bin to a storage area after filling.

Accordingly, it is an object of this invention to provide for a novel machine which unstacks and dispenses bins to be filled.

Another object is to provide for a bin unstacker which is compact and is highly efficient and economical.

Another object is to provide for a bin unstacker and conveyor which synchronously unstacks and transports bins from the machine to a filling area then to a storage area.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
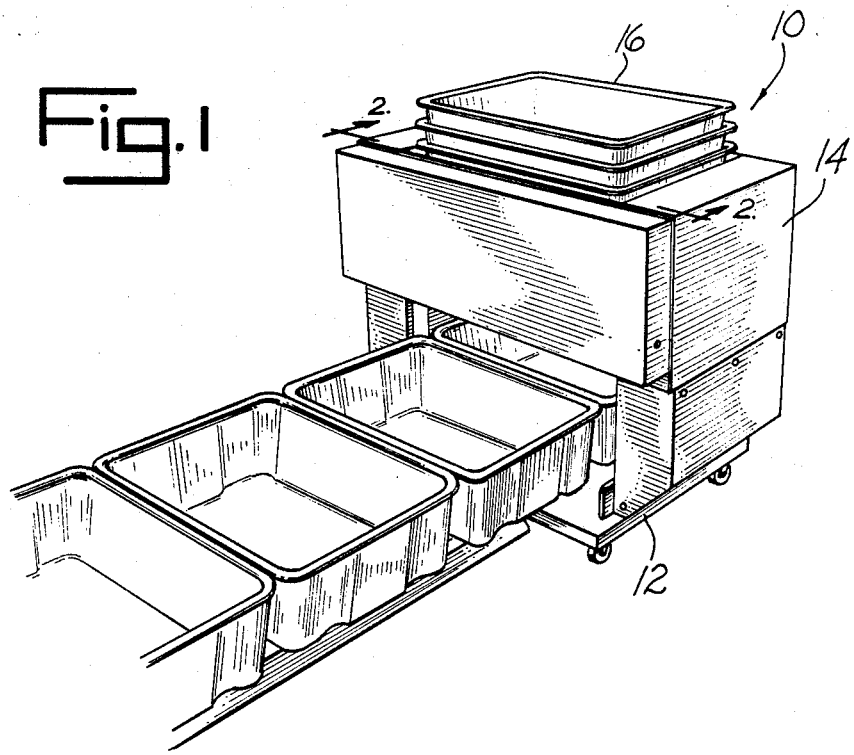
FIG. 1 is a perspective view of the bin unstacking machine in operation.

Referring now to FIG. 1, reference numberal 10 refers generally to the bin unstacking machine of this invention. Machine 10 is preferably compact in size and includes support frame 12 surrounded by housing 14. Machine 10 is adapted to accept a plurality of containers, such as fiberglass bins 16 and to dispense each bin individually for filling with articles (not shown) to be stored and/or packaged for distribution.

Figure 2:
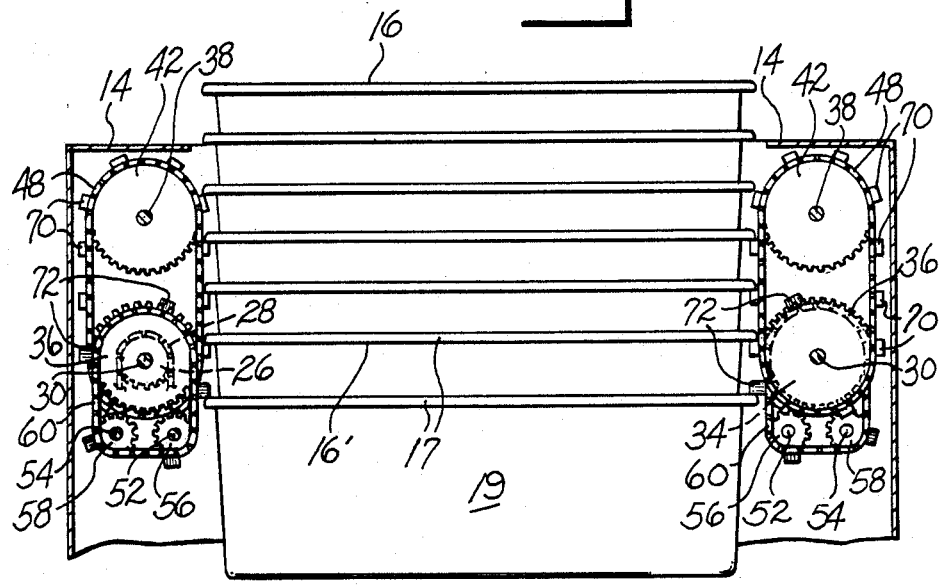
FIG. 2 is a sectional view taken along line 2—2 of FIG. 1.
Figure 3:
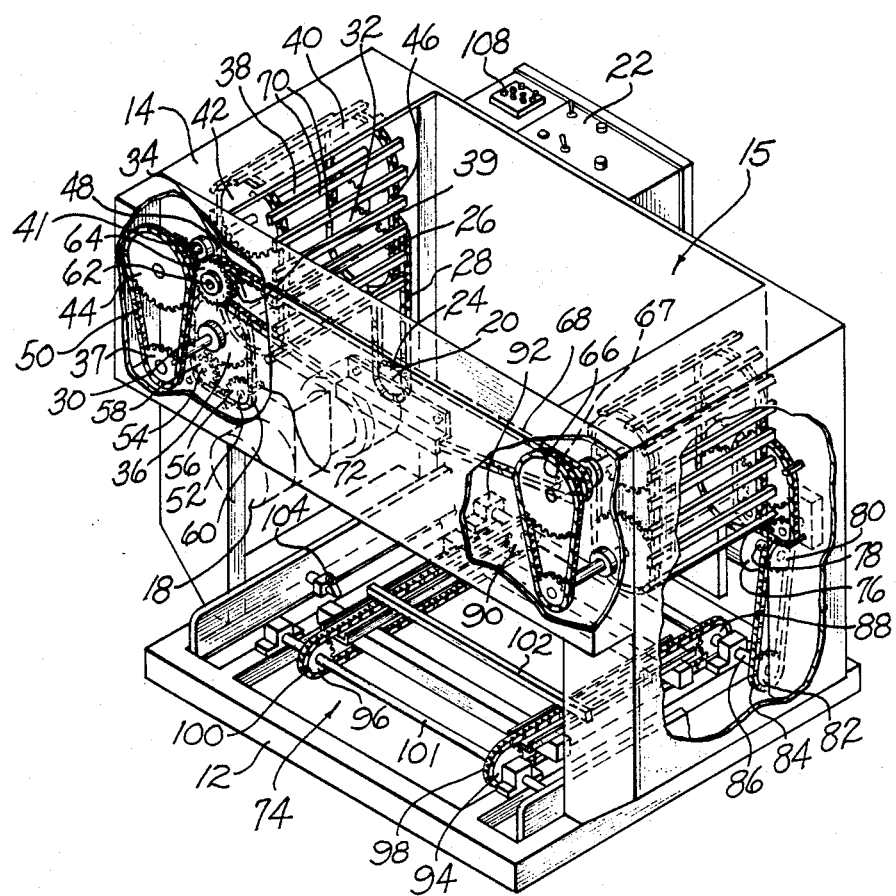
FIG. 3 is a perspective view of the machine with portions of the frame housing cut away for illustrative purposes.
Figure 4:
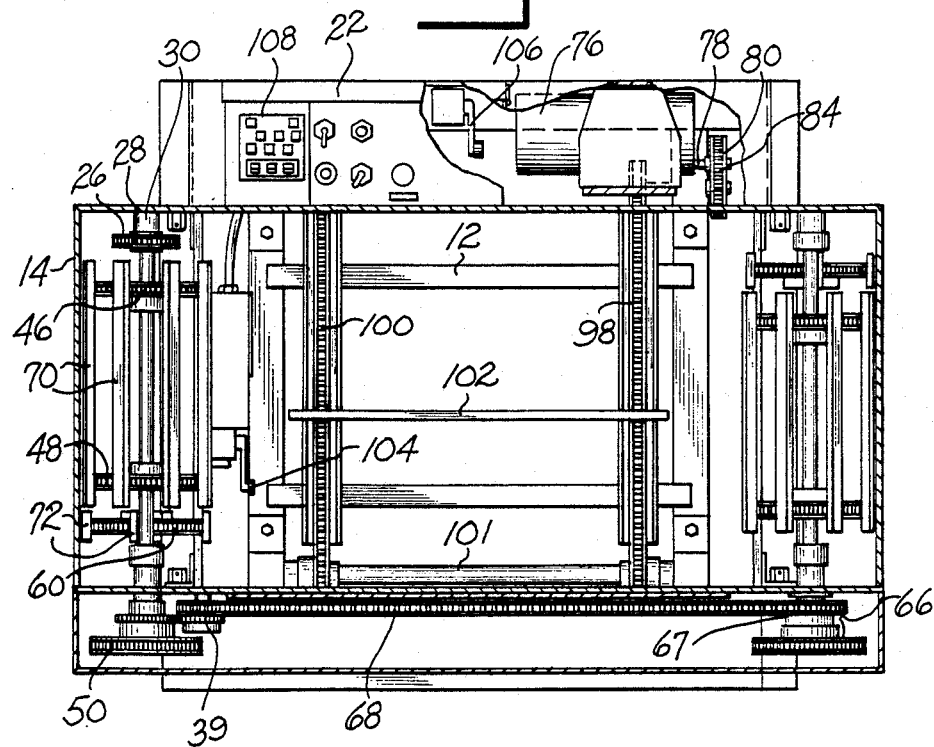
FIG. 4 is a top plan view of the machine with a portion of the frame housing cut away to expose the conveyor control.
Figure 5:
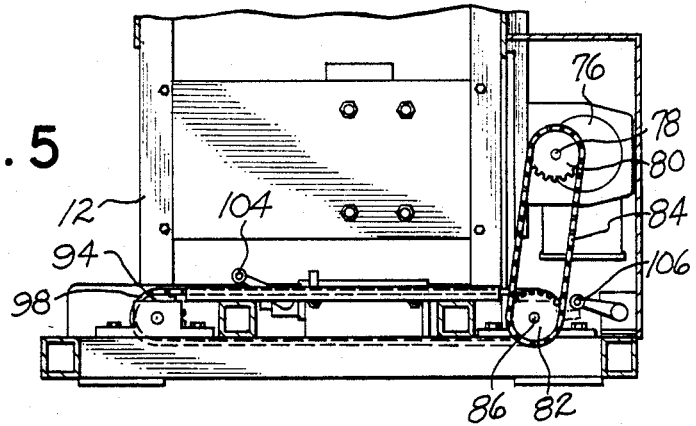
FIG. 5 is a detail fragmentary side elevation view of the conveyor control.

FIGS. 2-4 illustrate the mechanism for supporting and distributing individual bins 16. A motor 18 which rotates a drive shaft 20 is electrically connected to a relay logic circuit or, alternatively, to a programmable controller 22. A drive sprocket wheel 24 is keyed to drive shaft 20 and is connected to a sprocket wheel 26 by chain 28. Sprocket wheel 26 is keyed to shaft 30 which carries rotating sprocket wheels 32, 34, 36 and 37. Sprocket wheels 36, 37 are keyed to shaft 30 while sprocket wheels 32, 34 are connected to the shaft 30 by way of bearings (not shown) and rotate at a lower speed than the shaft. A shaft 38 is disposed above shaft 30 and is keyed to sprocket wheels 40, 42 and 44 and to spur gear 41. Chain 46 connects sprocket wheels 32 and 40. Chain 48 connects sprocket wheels 34 and 42. Chain 50 connects sprocket wheels 37 and 44 for correlative rotation of all sprocket wheels commensurate with rotation of drive shaft 20 and sprocket wheel 24. Sprocket wheels 56, 58 rotate about shafts 52, 54, respectively, and are connected for correlative rotation with sprocket wheel 36 by chain 60. Spur gear 64 rotates about shaft 62 and meshes with spur gear 41. Sprocket wheel 39 is fastened to spur gear 64 and turn about shaft 62. A chain 68 connects sprocket gear 39 and sprocket wheel 67 on the opposite side of machine 10. Sprocket wheel 66 is keyed to sprocket wheel 67 positioned at the opposite side of machine 10 and drives the supporting and distribution mechanism on that side of the machine. This mechanism is identical in all respects with the supporting and distribution mechanism outlined above with the exception of the motor 18, shaft 20 and drive sprocket wheels 24 and 26 and will not be described further. It should be noted that correlation of directional movement of all chains on both sides of machine 10 is achieved by reversing the rotation on the opposite side of the machine through meshing spur gears 39, and 41.

Connected between chains 46 and 48 are a plurality of spaced bars 70. Each bar 70 as shown in FIG. 2 fits under a lip 17 of an individual container 16 to support the container. Connected to chain 60 are a plurality of tab projections 72. As shown in FIG. 2, each tab 72 serves to push downwardly on lip 17 of the lowermost bin 19 to urge that bin off the stack and onto a conveyor mechanism 74.

Machine 10 also includes conveyor mechanism 74 which receives a destacked container 16 and transports it away from the machine. As shown in FIG. 1, containers 16 are transported to a production line in consecutive fashion where they may be loaded and later stored or emptied. The conveyor mechanism 74 includes a motor 76 which rotates a drive shaft 78. Motor 76 is electrically connected to programmable controller 22. Sprocket wheel 80 is keyed to drive shaft 78 for correlative rotation therewith and is operatively connected to sprocket wheel 82 by chain 84. Shaft 86 journals sprocket wheels 82, 88 and 90 and terminates in a bearing block 92. Sprocket wheels 88 and 90 are connected to sprocket wheels 94 and 96, respectively, by endless chains 98 and 100. Shaft 101 journals sprocket wheels 94, 96 as shown with chains 98 and 100 being spaced and forming conveyor mechanism 74 for transporting bins 16 away from machine 10.

Connected between chains 98 and 100 are one or more push rods or bars 102 which urge the individual bins 16 away from the machine 10. A pressure actuated switch 104 is positioned as shown in FIG. 3 and is connected between programmable controller 22 and conveyor motor 76. A second pressure actuated switch 106 is positioned at the rear of conveyor mechanism 74 and is connected between programmable controller 22 and motor 18. The operation of switches 104, 106 is discussed below. A counter 108 may be connected to programmable controller 22 and to a parts dispensing machine (not shown). Counter 108 signals programmable controller 22 when one of bins 16 which has exited machine 10 is filled and allows the machine to cycle and dispense another bin from the stack. Counter 108 may either be used to count articles (not shown) or may be used as a timer to cycle the machine 10 at predetermined time intervals.

Machine 10 operates to unstack and dispense bins 16 as follows. A stack of bins 16 is loaded into machine 10 through frame opening 15 with the lip 17 of the lowermost bin resting on and supported by bars 70. Machine 10 is cycled until the lowermost bin has reached the dispensing position identified by numeral 16' in FIG. 2. Machine 10 is now ready for use and programmable controller 22 is switched on. Controller 22 activates motor 18 to turn drive shaft 20. Due to the interconnection of sprocket wheels 24, 26, 32, 34, 36, 37, 39, 40, 42, 44, 56, 58, and 66 by chains 28, 46, 48, 50, 60 and 68, these sprocket wheels rotate to lower bins 16 until the lowermost bin is positioned as seen in FIG. 2 and identified by reference numeral 19. As sprocket wheels 36, 56 and 58 rotate, tabs 72 of chain 60 (which turns at a 2:1 ratio compared with chains 46 and 48) urge bin 19 downwardly onto conveyor mechanism 74 where bin 19 contacts pressure switch 104. Switch 104 signals conveyor motor 76 through controller 22 to turn sprocket wheels 80, 82, 88, 90, 94 and 96 and conveyor chains 98 and 100. Bar 102 contacts bin 19 and urges it away from machine 10 with chains 98, 100 continuing to move until bar 102 contacts pressure switch 106. Motor 76 then stops and motor 18 starts to dispense another bin 19 onto conveyor mechanism 74. The machine cycles allow for continuous unstacking and dispensing of bins 19 until the stack of bins 16 has been depleted.

It is understood that the above description does not limit the invention to the details above-given, but may be modified within the scope of the appended claims.

I claim:

1. In combination, a plurality of containers and a machine for unstacking one container from said plurality of containers and delivering said one container to a filling position, said machine comprising a frame, a first endless chain positioned adjacent opposite ends of said plurality of containers, said first chain being rotated about a first gear means and including a plurality of bars, said first chain and bars constituting means for engaging said plurality of containers and supporting the containers above a transport means, said transport means for conveying said one container away from said machine, said machine further including a second endless chain positioned adjacent to and parallel to each first endless chain, said second endless chain being rotated about a second gear means and including a plurality of tabs parallel to and adjacent said bars, said tabs contacting an upper edge of said one container, first driving means for synchronously driving said first and second chains, said second chain being driven at a speed greater than said first chain so that said second chain and tab disengage said one container from said plurality of containers, and second driving means for driving said transport means.

2. The combination of claim 1 and further including first sensing means for sensing said one container contacting the transport means, control means for actuating said second driving means to drive said transport means in response to said first sensing means sensing that said one container contacted the transport means, means for coupling the first sensing means to the control means, and means for coupling the control means to the transport means.

3. The combination of claim 1 wherein said first and second driving means include first and second motors, respectively.

4. The combination of claim 2 wherein said transport means includes two spaced parallel endless conveyor chains, a push rod connected between and spanning said conveyor chains, said push rod constituting means for urging said one container away from said machine.

5. The combination of claim 2 and further including second sensing means for sensing that said one container exited said machine, said control means actuating said driving means to drive said first and second chains in response to said second sensing means sensing that said one container exited said machine, means for coupling said second sensing means to said control means, and means for coupling said control means to said driving means.

6. An apparatus for unstacking stacked bins, comprising endless chain means for supporting the stacked bins and moving them downwardly at a first speed, endless chain means for stripping the bottommost bin from the stack of stacked bins to unstack the bottommost bin including plural stripping members for engaging the bottommost bin and means for moving the stripping members downwardly at a second speed which is greater than the first speed so that one stripping member pushes the bottommost bin from the stack of bins.

7. The apparatus of claim 6 wherin the means for supporting the bins includes a plurality of bin support members which progressively and successively engage and disengage the bins and means for moving the bin support members engaging the bins downwardly to move the bins downwardly and to disengage the bin support member supporting the bottommost bin from the bottommost bin before the stripping member engages the bottommost bin wherein the second bottommost bin remains supported by a bin support member.

8. The apparatus of claim 7 wherein each bin has an outwardly extending perimetral lip, the bin support members vertically spaced from each other such that each bin support member engages a bin beneath the perimetral lip of that bin such that the perimetral lip of that bin rests on that bin support member.

9. The apparatus of claim 8 wherein the means for supporting the stacked bins and moving them downwardly at a first speed comprises a first endless chain to which the bin support members are affixed in spaced relation to each other, a plurality of first spaced apart sprocket wheels about which the first endless chain is entrained, and means for rotating at least one of the first spaced apart sprocket wheels.

10. The apparatus of claim 9 wherein the stripping means includes a plurality of fingers affixed to a second endless chain in spaced relation to each other, a plurality of second spaced apart sprocket wheels about which the second endless chain is entrained, and means for rotating at least one of the second spaced apart sprocket wheels.

11. An apparatus for unstacking stacked bins wherein each bin has an outwardly extending perimetral lip, comprising means for supporting the stacked bins and moving them downwardly at a first speed, the bin support and moving means comprising first and second endless chain assemblies disposed on opposite sides of the stacked bins, each endless chain assembly including at least one endless chain entrained on a plurality of spaced apart sprocket wheels, each endless chain including a plurality of spaced apart bin support members affixed thereto, at least one of the bin support members of each of the first and second endless chain assemblies engaging at least one of the stacked bins beneath that bin's perimetral lip wherein the perimetral lip of that bin rests on respective bin support members of the first and second endless chain assemblies to support the bin, means for rotating at least one sprocket wheel of each of the first and second endless chain assemblies to move the bin support members engaging the stacked bins downwardly at a first speed to move the stacked bins downwardly at the first speed, and means for stripping the bottommost bin from the stack of stacked bins to unstack the bottommost bin, the stripping means comprising third and fourth endless chain assemblies disposed on opposite sides of the stacked bins, each of the third and fourth endless chain assemblies including at least one endless chain entrained on a plurality of spaced apart sprocket wheels, each endless chain of the third and fourth endless chain assemblies including a plurality of spaced apart stripping members affixed thereto, and means for rotating at least one of the sprocket wheels of each of the third and fourth endless chain assemblies to move the stripping members downwardly at a second speed greater than the first speed wherein a stripping member of each of the third and fourth endless chain assemblies engages the top of the perimetral lip of the bottommost stacked bin pushes it downwardly from the stack of stacked bins to unstack it, the bin support members on which the perimetral lip of the bottommost bin rests being carried away from the perimetral lip of the bottommost bin by the respective endless chains to which they are affixed before the stripping members of the stripping means engage the top of the perimetral lip of the bottommost bin.

12. The apparatus of claim 11 wherein each endless chain assembly of the bin support and moving means includes first and second endless chains in horizontal spaced relation to each other, the first and second endless chains entrained on a plurality of respective spaced apart sprocket wheels, the bin support members comprising horizontally extending bars affixed at each end to the first and second endless chains, respectively, and the means for moving the bins downwardly comprises means for rotating at least one of the sprocket wheels on which the first and second endless chains are entrained.

* * * * *